US012743956B2

(12) United States Patent
Hatakeyama

(10) Patent No.: US 12,743,956 B2
(45) Date of Patent: Sep. 22, 2026

(54) ALERT DEVICE, ALERT METHOD AND ALERT PROGRAM

(71) Applicant: TOYOTA JIDOSHA KABUSHIKI KAISHA, Toyota (JP)

(72) Inventor: Hirotaka Hatakeyama, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 50 days.

(21) Appl. No.: 18/953,561

(22) Filed: Nov. 20, 2024

(65) Prior Publication Data

US 2025/0174128 A1 May 29, 2025

(30) Foreign Application Priority Data

Nov. 24, 2023 (JP) ................................ 2023-199258

(51) Int. Cl.
*G08G 1/16* (2006.01)

(52) U.S. Cl.
CPC .................................... *G08G 1/166* (2013.01)

(58) Field of Classification Search
CPC ... G08G 1/166; G08G 1/167; B60W 30/0956; B60W 50/00; B60W 50/14; B60W 2050/0002
USPC .......................................................... 340/903
See application file for complete search history.

(56) References Cited

U.S. PATENT DOCUMENTS 8,548,643 B2 * 10/2013 Asano .................... G08G 1/166 701/1
8,577,550 B2 * 11/2013 Lu .................... B60W 30/0956 340/435
9,105,190 B2 8/2015 Akiyama
9,393,960 B2 7/2016 Kodaira
9,483,945 B2 11/2016 Okita et al.
9,873,412 B2 1/2018 Moriizumi
10,793,147 B2 10/2020 Kaminade et al.
2016/0140847 A1 5/2016 Kawamata et al.
2019/0213886 A1 7/2019 Noda et al.
(Continued)

FOREIGN PATENT DOCUMENTS

EP 3 021 305 A2 5/2016
JP 2013-134567 A 7/2013
(Continued)

OTHER PUBLICATIONS

Communication dated Jul. 2, 2026, issued in Korean Application No. 10-2024-0158968.

*Primary Examiner* — Eric Blount
(74) *Attorney, Agent, or Firm* — Sughrue Mion, PLLC

(57) ABSTRACT

An alert device including a driving assistance control unit configured to operate a notification device to provide an alert when a collision between an own vehicle and another vehicle is judged to be possible, the driving assistance control unit sets a possibility judgment area that extends along an intersecting road intersecting an own vehicle's road, and judges whether or not there is a possibility of collision by judging whether or not there is another vehicle approaching the possibility judgment area, and furthermore, the driving assistance control unit sets a width direction range of the possibility judgment area variably according to at least one of the right/left turn direction of the own vehicle at an intersection, a lane configuration of the intersecting road, and a width of a lane of the intersecting road.

8 Claims, 6 Drawing Sheets

(56) References Cited

U.S. PATENT DOCUMENTS

| | | | |
|---|---|---|---|
| 2020/0324762 | A1 | 10/2020 | Pfadler et al. |
| 2021/0061309 | A1 | 3/2021 | Kawanai |
| 2021/0107521 | A1 | 4/2021 | Fujita et al. |
| 2021/0107528 | A1 | 4/2021 | Fujita et al. |
| 2021/0146956 | A1 | 5/2021 | Fujita et al. |
| 2021/0146958 | A1 | 5/2021 | Tanaka et al. |
| 2021/0312811 | A1* | 10/2021 | Ohlarik .................... G08G 1/20 |
| 2023/0282112 | A1 | 9/2023 | James et al. |

FOREIGN PATENT DOCUMENTS

| | | | |
|---|---|---|---|
| JP | 2016-095697 | A | 5/2016 |
| KR | 10-2019-0008292 | A | 1/2019 |
| KR | 10-2023-0071909 | A | 5/2023 |

* cited by examiner

ALERT DEVICE, ALERT METHOD AND ALERT PROGRAM

CROSS-REFERENCE TO RELATED APPLICATION

This application claims priority to Japanese Patent Application No. JP2023-199258 filed on Nov. 24, 2023, the content of which is hereby incorporated by reference in its entirety into this application.

BACKGROUND

1. Technical Field

This disclosure relates to an alert device, alert method and alert program for vehicles such as automobiles, and more specifically, to an alert device, alert method and alert program that provides alerts when a vehicle is driving through an intersection.

2. Description of the Related Art

As one of the alert devices for vehicles such as automobiles, there is a known alert device that acquires information on targets around a vehicle and, when it is determined that there is a possibility of collision between the vehicle and another vehicle based on acquired object information, it issues an alarm to alert a driver.

For example, in a publication of Japanese Patent Application Laid-open No. 2013-134567, an alert device is described that determines a possibility of a collision between an own vehicle and another vehicle traveling in the same direction as the own vehicle traveling after turning right or left at an intersection where an intersecting road on which the own vehicle travels after turning right or left is a road with multiple lanes on each side. In particular, if a lane in which the other vehicle is traveling is the same as a lane in which the own vehicle is estimated to be traveling after turning right or left, alert is given to notify a driver of the possibility of a collision. However, if the lane in which the other vehicle is traveling is different from the lane in which the own vehicle is estimated to be traveling after turning right or left, no alert is given.

SUMMARY

When a vehicle turns right or left at an intersection, part of the vehicle may protrude from a lane in which the vehicle travels after turning right or left, and the risk of this is higher the narrower the lane in which it is estimated that the vehicle will travel after turning right or left. In addition, another vehicle that may collide with the vehicle when it turns right or left differs depending on the direction in which the vehicle turns right or left at the intersection, i.e., whether it turns left or right, and also differs depending on the number of lanes on an intersecting road that the vehicle travels after turning right or left. Therefore, in conventional alert devices such as the alert device described in the above-mentioned publication, it may not be possible to appropriately alert a driver to the possibility of a collision when the vehicle is turning right or left at an intersection.

The present disclosure provides an improved alert device that can provide more appropriate alerts than conventional devices regarding the possibility of a collision between an own vehicle and another vehicle when the own vehicle turns right or left at an intersection.

According to the present disclosure, an alert device is provided, including a notification device, a target information acquisition device that acquires information on targets around an own vehicle, and an electronic control unit configured to operate the notification device to provide an alert when the electronic control unit judges that there is a possibility of collision between the own vehicle and another vehicle based on the information on targets acquired by the target information acquisition device.

The electronic control unit is configured to acquire information on an intersection ahead of the own vehicle, to set a possibility judgment area that extends along an intersecting road that intersects with the own vehicle's road, and to judge whether or not there is a possibility of collision by judging whether or not there is another vehicle approaching the possibility judgment area, and further, the electronic control unit is configured to set a width direction range of the possibility judgment area variably according to at least one of turning direction of the own vehicle at the intersection, a lane configuration of the intersecting road, and a width of a lane of the intersecting road.

In addition, according to the present disclosure, an alert method is provided that includes a step of acquiring information on targets around an own vehicle and, based on the acquired information on targets, activating a notification device to provide an alert when it is judged that there is a possibility of collision between the own vehicle and another vehicle.

The alert method further includes a step of acquiring information on an intersection in front of the own vehicle, a step of setting a possibility judgment area that extends along an intersecting road that intersects with the own vehicle's road, and a step of judging whether or not there is a possibility of collision by judging whether or not there is another vehicle approaching the possibility judgment area, and in the step of setting the possibility judgment area, a width direction range of the possibility judgment area is variably set according to at least one of turning direction of the own vehicle at the intersection, a lane configuration of the intersecting road, and a width of a lane of the intersecting road.

Furthermore, according to the present disclosure, a non-transitory computer-readable storage medium storing a program for causing a computer installed on an own vehicle to execute an alert control, the program causing the computer to implement processes of a step of acquiring information on targets around the own vehicle and, based on the acquired information on targets, activating a notification device to provide an alert when it is determined that there is a possibility of collision between the own vehicle and another vehicle.

The program further includes a step of acquiring information on an intersection in front of the own vehicle, a step of setting a possibility judgment area that extends along an intersecting road that intersects with the own vehicle's road, and a step of judging whether or not there is a possibility of collision by judging whether or not there is another vehicle approaching the possibility judgment area, and in the step of setting the possibility judgment area, a width direction range of the possibility judgment area is variably set according to at least one of turning direction of the own vehicle at the intersection, a lane configuration of the intersecting road, and a width of a lane of the intersecting road.

According to the above-mentioned alert device, alert method, and alert program, a possibility judgment area extending along the intersecting road that intersects with the own vehicle's road is set, and whether there is a possibility of collision is judged by determining whether there is another vehicle approaching the possibility judgment area. Furthermore, the width of the possibility judgment area is set to be variable according to at least one of the turning direction of the own vehicle at the intersection, a lane configuration of the intersecting road, and a width of a lane of the intersecting road.

Therefore, as compared to conventional alert devices, which have a fixed width direction range of the possibility judgment area regardless of turning direction of the own vehicle at an intersection, a lane configuration of a intersecting road, and a width of a lane of the intersecting road, it is possible to appropriately alert a driver to the possibility of a collision with another vehicle when the own vehicle turns right or left at the intersection.

In one aspect of the present disclosure, the electronic control unit is configured to set the width direction range of the possibility judgment area to a full width range of the intersecting road when the own vehicle is turning right at an intersection on left-hand traffic road or turning left at an intersection on right-hand traffic road.

According to the above aspect, when the own vehicle turns right at an intersection on a left-hand traffic road, or when the own vehicle turns left at an intersection on a right-hand traffic road, the width direction range of the possibility judgment area is set to a full width of the intersecting road. Therefore, when the own vehicle is turning right at an intersection on a left-hand traffic road, it can be judged that there is a possibility of collision when there is another vehicle approaching the possibility judgment area from the left. Also, when the own vehicle is turning left at an intersection on a right-hand traffic road, it can be judged that there is a possibility of collision when there is another vehicle approaching the possibility judgment area from the right. Therefore, as compared to where the width direction range of the possibility judgment area is a part of the full width range of the intersecting road, it is possible to appropriately judge the possibility of a collision between the own vehicle and another vehicle regardless of the turning direction of the own vehicle, and to appropriately alert the driver to the possibility of a collision.

In another aspect of the present disclosure, the electronic control unit is configured to set the width direction range of the possibility judgment area to a full width range of the intersecting road when the own vehicle is turning left at an intersection on a left-hand traffic road or turning right at an intersection on a right-hand traffic road and there is no center line on the intersecting road.

According to the above aspect, when the own vehicle is turning left at an intersection on a left-hand traffic road or turning right at an intersection on a right-hand traffic road and there is no center line on the intersecting road, the width direction range of the possibility judgment area is set to a full width of the intersecting road. Therefore, in both cases where the own vehicle is turning left at an intersection on a left-hand traffic road and where the own vehicle is turning right at an intersection on a right-hand traffic road, it is possible to judge that there is a possibility of collision when there is another vehicle approaching the possibility judgment area from the left or right. Therefore, as compared to where the width direction range of the possibility judgment area is a part of the full width of the intersecting road, it is possible to appropriately judge the possibility of a collision between the own vehicle and another vehicle and to appropriately alert the driver to the possibility of the collision.

In addition, in another aspect of the present disclosure, the electronic control unit is configured to set the width direction range of the possibility judgment area to a sum of a width direction range of a lane in which the own vehicle is estimated to travel after turning and a width direction range of an adjacent lane, when the own vehicle is turning left at an intersection on a left-hand traffic road or turning right at an intersection on a right-hand traffic road and the intersecting road is a multi-lane road with multiple lanes on each side.

According to the above aspect, when the own vehicle is turning left at an intersection on a left-hand traffic road or turning right at an intersection on a right-hand traffic road and the intersecting road is a road with multiple lanes on each side, the width direction range of the possibility judgment area is set to a sum of a width of a lane in which the own vehicle is estimated to travel after turning left or right and a width direction range of an adjacent lane. Therefore, as compared to where the width direction range of the possibility judgment area is set only to the width of the lane in which the own vehicle is estimated to travel after turning left or right, it is possible to appropriately judge the possibility of a collision with another vehicle and appropriately alert the driver to the possibility of the collision.

Furthermore, in another aspect of the present disclosure, in a situation where the own vehicle is turning left at an intersection on a left-hand traffic road or turning right at an intersection on a right-hand traffic road and the intersecting road is a single-lane road with a single lane on each side, when a width of the lane in which the own vehicle is estimated to travel after turning left or right is equal to or greater than a reference value, the width direction range of the possibility judgment area is set to a width direction range of the lane in which the own vehicle is estimated to travel after turning left or right, and when the width of the lane in which the own vehicle is estimated to travel after turning left or right is less than the reference value, the width direction range of the possibility judgment area is set to a sum of the width direction range of the estimated lane and a width direction range of a part of an oncoming lane adjacent to the estimated lane.

According to the above aspect, when the intersecting road is a single-lane road, and a width of the lane in which the own vehicle is estimated to travel after turning right or left is greater than the reference value, the width direction range of the possibility judgment area is set to a width of the estimated lane. Therefore, it is possible to avoid setting the width direction range of the possibility judgment area to an unnecessarily large width range.

In addition, according to the above aspect, when a width of a lane in which the own vehicle is estimated to travel after turning right or left is less than the reference value, the width direction range of the possibility judgment area is set to a sum of the width of the lane in which the own vehicle is estimated to travel after turning right or left and the width of a part of the oncoming lane adjacent to the estimated lane. Therefore, as compared to where the width direction range of the possibility judgment area is set so that it does not include the width of a part of the oncoming lane, it is possible to appropriately judge the possibility of a collision between the own vehicle and another vehicle and appropriately alert the driver to the possibility of the collision.

In another aspect of the present disclosure, the electronic control unit is configured to set the width direction range of the part of the oncoming lane in a variable manner according to a vehicle speed of the own vehicle when entering an intersection, so that the width direction range of the part becomes larger as the vehicle speed of the own vehicle when entering the intersection is higher.

The risk of a portion of the own vehicle veering out of the lane after turning right or left at an intersection increases as a vehicle speed of the own vehicle entering the intersection increases.

According to the above aspect, the width of the above-mentioned part is set to be variable according to a vehicle speed of the own vehicle when entering the intersection, so that the width of the above-mentioned part becomes larger as the vehicle speed of the own vehicle when entering the intersection becomes higher. Therefore, as compared to where the width direction range of the above-mentioned part is constant regardless of the vehicle speed of the own vehicle when entering the intersection, it is possible to appropriately judge the possibility of a collision with another vehicle and appropriately alert the driver to the possibility of the collision.

In another aspect of the present disclosure, the width direction range of the part of the oncoming lane is a range set in accordance with a wheelbase of the own vehicle so that the width direction range of the part becomes larger as the wheelbase of the own vehicle is larger.

The risk of a portion of the own vehicle veering from the lane after turning right or left at an intersection due to factors such as outer wheels difference increases as a wheelbase of the own vehicle increases.

According to the above aspect, the width direction range of the above-mentioned part is set in accordance with the wheelbase of the own vehicle, so that the width direction range of the above-mentioned part increases as the wheelbase of the own vehicle increases. Therefore, as compared to where the width direction range of the above-mentioned part is constant regardless of the wheelbase of the own vehicle, it is possible to appropriately judge the possibility of a collision between the own vehicle and another vehicle and appropriately alert the driver to the possibility of the collision.

In this application, a road on which the own vehicle travels before entering an intersection is referred to as the "own vehicle's road", and a road that intersects with the own vehicle's road at the intersection is referred to as "intersecting road". Furthermore, the intersection is a place where the own vehicle traveling on the vehicle's road can turn right or left and move to a intersecting road, and can be a crossroads, T-junction, etc.

Other objects, other features and attendant advantages of the present disclosure will be readily understood from the description of the embodiments of the present disclosure described with reference to the following drawings.

DETAILED DESCRIPTION OF THE PREFERRED EMBODIMENTS

An alert device according to embodiments of the present disclosure will be described in detail below with reference to the accompanying drawings.

Figure 1:
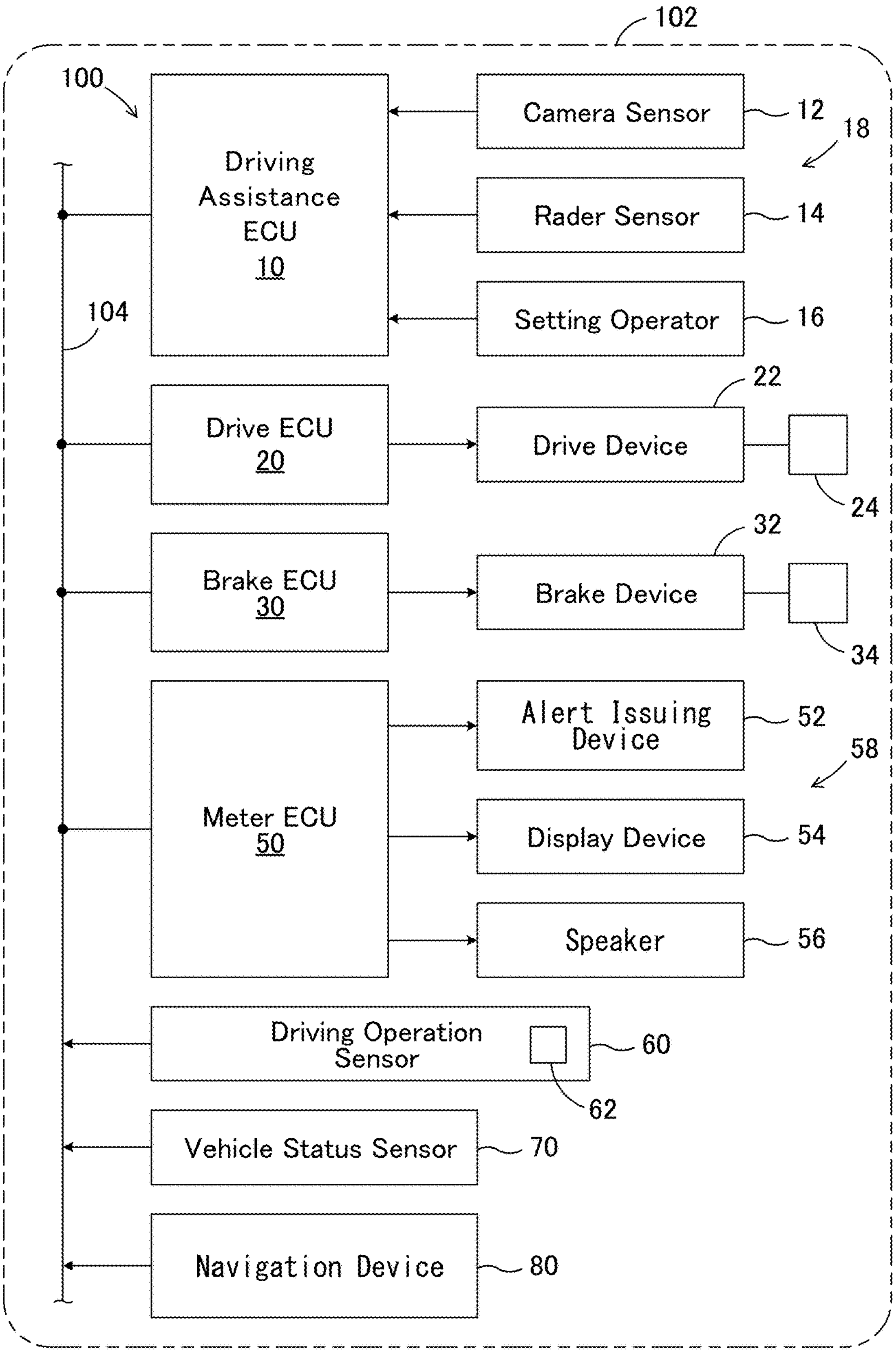
FIG. 1 is a schematic diagram showing the embodiment of the alert device for a vehicle.

As shown in FIG. 1, the alert device 100 according to the embodiment of the present disclosure is applied to a vehicle 102 and includes a driving assistance ECU 10. The vehicle 102 is a vehicle capable of automatic driving and is equipped with a drive ECU 20, a brake ECU 30, an electric power steering ECU 40, and a meter ECU 50. The term "ECU" refers to an electronic control unit (Electronic Control Unit) that has a microcomputer as its main component. In the following description, vehicle 102 is referred to as own vehicle 102 as necessary.

The microcomputer of each ECU includes a CPU, ROM, RAM, read/write non-volatile memory (N/M), and interface (I/F), and the like. The CPU realizes various functions by executing instructions (programs, routines) stored in the ROM. Furthermore, these ECUs are connected to each other in such a way that they can exchange data (communicate) via the Controller Area Network (CAN) 104. Therefore, detected values of sensors (including switches) connected to a specific ECU are also transmitted to other ECUs.

The driving assistance ECU 10 is a central control device that performs driving assistance control, such as alert control and lane keeping control, when the vehicle 102 is traveling through an intersection. In the embodiment, the driving assistance ECU 10, as will be explained in detail later, performs the alert control when driving through an intersection in cooperation with other ECUs.

The driving assistance ECU 10 is connected to a camera sensor 12, a radar sensor 14, and a setting operator 16. The camera sensor 12 and the radar sensor 14 each include multiple camera devices and multiple radar devices. The camera sensor 12 and the radar sensor 14 function as a target information acquisition device 18 that acquires target information around the own vehicle 102.

Each camera device of the camera sensor 12, which is not shown in the FIG. 1, is equipped with a camera part that takes pictures of the surroundings of the own vehicle 102 and a recognition part that analyzes the image data obtained by the camera part to recognize targets such as road white lines and other vehicles. The recognition part supplies information about the recognized targets to the driving assistance ECU 10 at predetermined intervals.

Each radar device of the radar sensor 14 is equipped with a radar transmitter/receiver and a signal processing unit (not shown in the FIG. 1). The radar transmitter/receiver emits radio waves in the millimeter wave band (hereinafter referred to as "millimeter waves") and receives the millimeter waves reflected by three-dimensional objects (e.g., other vehicles, bicycles, and the like) that exist within a transmitting range (i.e., reflected waves). The signal processing unit supplies information to the driving assistance ECU 10 at predetermined intervals, such as a distance between the own vehicle and a solid object, a relative velocity between the own vehicle and the solid object, and a relative position (direction) of the solid object with respect to the own vehicle, based on a phase difference between the transmitted millimeter wave and the received reflected wave, an attenuation level of the reflected wave, and a time from transmitting the millimeter wave to receiving the reflected wave. In addition, LiDAR (Light Detection And Ranging) may be used in place of or in addition to the radar sensor 14.

The setting operator 16 is provided in a position that can be operated by a driver, such as a steering wheel, which is not shown in FIG. 1, and is operated by the driver. Although not shown in FIG. 1, the setting operator 16 includes a driving assistance switch. As will be explained in detail later, the driving assistance ECU 10 executes the alert control for driving through an intersection when the driving assistance switch is turned on.

The drive ECU 20 is connected to a drive device 22 that accelerates the vehicle 102 by applying driving force to drive wheels 24. Under normal conditions, the drive ECU 20 controls the drive device 22 so that the driving force generated by the drive device 22 varies in accordance with the driving operation by the driver, and when it receives a command signal from the driving assistance ECU 10, it controls the drive device 22 based on the command signal.

The brake ECU 30 is connected to a brake device 32 that decelerates the vehicle 102 by applying braking force to wheels 34. Under normal conditions, the brake ECU 30 controls the brake device so that the braking force generated by the brake device 32 changes in accordance with the braking operation by the driver, and when it receives a command signal from the driving assistance ECU 10, it performs automatic braking by controlling the brake device 32 based on the command signal.

Therefore, the brake ECU 30 and the brake device 32 function together as an automatic brake device. In addition, when braking force is applied to the wheels due to deceleration control during cornering, etc., the brake lights, which are not shown in FIG. 1, are turned on.

The meter ECU 50 is connected to an alert issuing device 52 that issues alerts, a touch panel display 54 that displays status of the controls executed by the driving assistance ECU 10, and a speaker 56 that issues audio information. The alert issuing device 52, display 54 and speaker 56 function as a notification device 58 that notifies the driver when the meter ECU 50 receives a command signal from the driving assistance ECU 10 and is controlled by the meter ECU 50 based on the command signal.

The alert issuing device 52 includes an alert buzzer that emits an auditory alert. The alert buzzer emits an alert sound when it is determined that the own vehicle 102 is likely to collide with another vehicle. The alert issuing device 52 may also include a visual alert device such as an alert lamp, and a haptic alert device that emits a haptic alert such as seat vibration.

The display 54 may be a multi-information display that displays meters and various types of information, or it may be a display of a navigation device 80 described below. The display 54 may be configured to display information about a possibility of a collision when it is determined that the own vehicle 102 is likely to collide with another vehicle.

A driving operation sensor 60 and a vehicle status sensor 70 are also connected to the CAN 104. Information detected by the driving operation sensor 60 and the vehicle status sensor 70 (referred to as sensor information) is transmitted to the CAN 104. The sensor information transmitted to the CAN 104 can be used as appropriate in each ECU. The sensor information may be information from a sensor connected to a specific ECU, and it may be transmitted from that specific ECU to the CAN 104.

The driving operation sensor 60 includes a driving operation amount sensor that detects an amount of operation of an accelerator pedal, a braking operation amount sensor that detects a master cylinder pressure or a force applied to a brake pedal, and a brake switch that detects whether or not the brake pedal is being operated. The driving operation sensor 60 also includes a steering angle sensor that detects a steering angle and a steering torque sensor that detects a steering torque.

Furthermore, the driving operation sensor 60 includes a switch that detects the operation of a turn signal lever 62, which is operated by the driver when the driver wishes to change lanes, etc. When the turn signal lever 62 is set to the left turn position or the right turn position, the meter ECU 50 causes left and right turn signal lamps, which are not shown in FIG. 1, to flash, respectively.

The vehicle status sensor 70 includes a vehicle speed sensor that detects a vehicle speed V of the vehicle 102, a longitudinal acceleration sensor that detects a longitudinal acceleration of the vehicle, a lateral acceleration sensor that detects a lateral acceleration of the vehicle, and a yaw rate sensor that detects a yaw rate of the vehicle.

In addition, the navigation device 80 is also connected to the CAN 104. The navigation device 80 is equipped with a GPS receiver that detects a position of the vehicle 102, a memory device that stores map information and road information, and a communication device that acquires the latest information on map information and road information from an external source. In particular, the road information may include information on intersections, such as crossroads or T-junctions. In addition, the navigation device 80 may not be provided.

Next, will be explained the first embodiment (FIGS. 2 to 8) for countries where vehicles travel on a left-hand traffic road and the second embodiment (FIG. 9) for countries where vehicles travel on a right-hand traffic road.

First Embodiment

Figure 2:
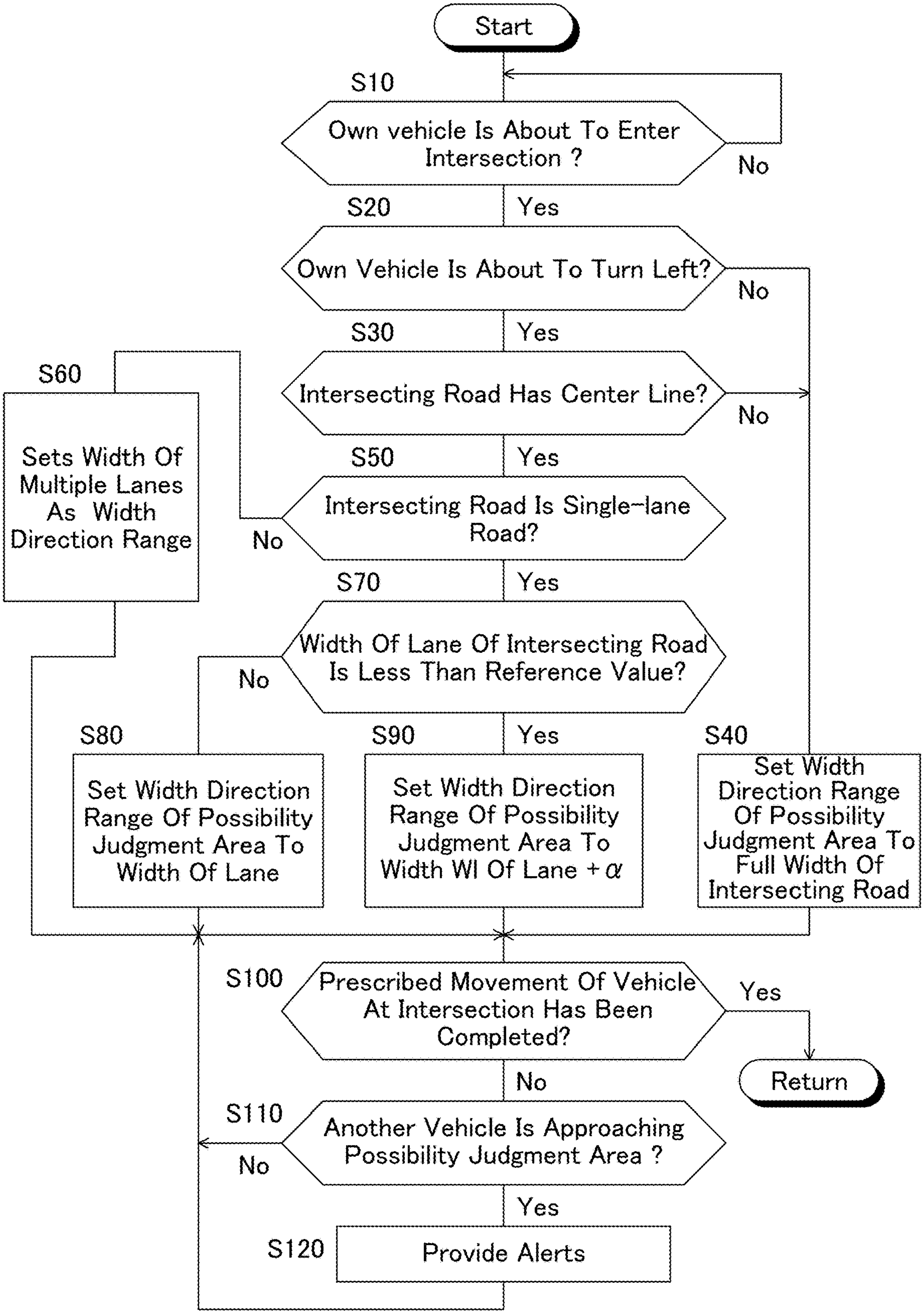
FIG. 2 is a flowchart corresponding to an alert control program in the first embodiment for countries where vehicles travel on the left.

In the first embodiment, the ROM of the driving assistance ECU 10 stores an alert program for driving through an intersection corresponding to the flowchart shown in FIG. 2, and the CPU executes the alert control according to the program. The alert method in the first embodiment is executed by executing the alert control. In the following description, the alert control is referred to as "the control".

Alert Control when Driving Through an Intersection in the First Embodiment

Next, referring to the flowchart shown in FIG. 2, will be explained the alert control when driving through an intersection in the first embodiment for countries where vehicles travel on the left. The alert control when driving through an intersection in the flowchart shown in FIG. 2 is repeatedly executed at predetermined intervals by the CPU of the driving assistance ECU 10 in the situation where the driving assistance switch is turned on.

First, in step S10, the CPU acquires information about the intersection ahead of the own vehicle based on image information captured by the camera sensor 12 of the target information acquisition device 18 and/or road information supplied by the navigation device 80. Furthermore, the CPU determines whether or not the own vehicle 102 is about to enter an intersection without traffic lights or an intersection where the traffic lights on the vehicle's road are flashing red. When a negative determination is made, the control returns to step S10, and when an affirmative determination is made, the control proceeds to step S20.

In addition, an affirmative determination may be made if it is determined that the own vehicle is approaching an intersection within a predetermined distance ahead or is stopped in front of the intersection based on the target information acquired by the target information acquisition device 18 and/or the road information and vehicle position information supplied by the navigation device 80.

In step S20, the CPU determines whether or not the own vehicle 102 is about to turn left, based on position of the turn signal lever 62 and/or blinking of the left turn signal light. When a negative determination is made, the control proceeds to step S40, and when an affirmative determination is made, the control proceeds to step S30.

In step S30, the CPU determines whether or not an intersecting road has a center line based on the road information supplied by the navigation device 80 and/or the image information captured by the camera sensor 12. When an affirmative determination is made, the control proceeds to step S50, and when a negative determination is made, the control proceeds to step S40.

In step S40, the CPU determines a full width Wt of the intersecting road based on the road information supplied by the navigation device 80 and/or the image information captured by the camera sensor 12. Furthermore, the CPU sets a width direction range of a possibility judgment area to the full width Wt of the intersecting road, and then the control proceeds to step S100.

In step S50, the CPU determines whether or not the intersecting road is a single-lane road based on the road information supplied by the navigation device 80 and/or the image information captured by the camera sensor 12. When an affirmative determination is made, the control proceeds to step S70, and when a negative determination is made, the control proceeds to step S60.

In step S60, the CPU identifies a lane in which the vehicle 102 is estimated to travel after turning left and an adjacent lane or lanes, based on the road information supplied by the navigation device 80 and/or the image information captured by the camera sensor 12, and sets the width Wd of the identified multiple lanes as the width direction range of the possibility judgment area to set the possibility judgment area. Subsequently, the control proceeds to step S100.

In step S70, the CPU determines a width W of the lane of the intersecting road based on the road information supplied by the navigation device 80 and/or the image information captured by the camera sensor 12, and determines whether or not a width W of a lane of the intersecting road is less than a reference value Wc (a positive constant). When an affirmative determination is made, the control proceeds to step S90, and when a negative determination is made, the control proceeds to step S80. The reference value Wc may be set in accordance with a vehicle width of the own vehicle so that the larger the vehicle width of the own vehicle, the larger the reference value Wc becomes, and it may be set in a variable manner in accordance with a vehicle speed V so that the higher the vehicle speed, the larger the reference value Wc becomes.

In step S80, the CPU identifies a lane in which the vehicle 102 is estimated to travel after turning left based on the road information supplied by the navigation device 80 and/or the image information captured by the camera sensor 12, and sets the width direction range of the possibility judgment area to a width WI of the lane identified above as. The control then proceeds to step S100.

In step S90, the CPU sets the width direction range of the possibility judgment area to a sum WI+$\alpha$ of the width WI of the lane identified above and a width (additional width) $\alpha$ of a part of an oncoming lane adjacent to the identified lane. Subsequently, the control proceeds to step S100. Although $\alpha$ is a positive constant that is smaller than a width of a lane on a typical road, it may be set in accordance with a width of the vehicle 102 so that it becomes larger as the width of the vehicle becomes larger. In addition, $\alpha$ may be set in a variable manner in accordance with the vehicle speed V so that it becomes larger as the vehicle speed becomes higher.

A range in a direction along the intersecting road (range in the longitudinal direction) of the possibility judgment area set in steps S40, S60, S80, and S90 may be set to include at least a range of the intersection. For example, the longitudinal range may be set to a range from a position where the own vehicle is first determined to be traveling along the intersecting road after turning left in the case of a left turn, to a position where the own vehicle is first determined to be traveling along the intersecting road after turning right in the case of a right turn, or a range including that range.

In step S100, the CPU determines whether or not a prescribed movement of the vehicle 102 at the intersection has been completed based on the target information acquired by the target information acquisition device 18 and/or the road information and the information on the position of the vehicle 102 supplied by the navigation device 80. When an affirmative determination is made, the control once ends, and when a negative determination is made, the control proceeds to step S110.

Notably, when the vehicle is turning left or right at an intersection, for example, if it is determined that the vehicle is traveling along a road on which the vehicle is estimated to travel after turning left or right, it may be determined that the prescribed movement of the vehicle has been completed. In addition, when the intersection is a crossroads and the vehicle is traveling straight through the intersection, for example, if it is determined that the vehicle has substantially passed through the intersection, it may be determined that the vehicle's prescribed movement has been completed.

In step S110, the CPU acquires the target information acquired by the target information acquisition device 18, and based on the target information, and determines whether or not it is necessary to issue an alert that there is another vehicle approaching the possibility judgment area and there is a possibility of collision. When a negative determination is made, the control returns to step S100, and when an affirmative determination is made, the control proceeds to step S120.

In step S120, the CPU activates the notification device 58 by outputting a command signal to the meter ECU 50, and displays an alert, such as "There is an approaching vehicle on the right side," on the display device 54. In addition, when there is a possibility that the own vehicle will collide with another vehicle, an alert sound may be emitted by activating the buzzer of the alert issuing device 52 in addition to the above displaying. Furthermore, when there is a possibility that the own vehicle will collide with another vehicle, a voice alert such as "Please be careful of the vehicle approaching from the right side" may be emitted by activating the speaker 56 in addition to the above displaying.

Operation of the First Embodiment

Next, referring to FIGS. 3 to 7, the operation of the first embodiment is explained in the cases where the own vehicle 102 turns left or right at various intersections (T-junctions). The operation of the first embodiment in the cases where the intersection is a crossroads is the same as the operation in the cases where the intersection is a T-junction. In FIGS. 3 to 7, 106 indicates an intersection, and 108 indicates a possibility judgment area. 110 indicates an intersecting road, and 112 indicates a road traveled by the own vehicle 102 before entering the intersection 106, that is an own vehicle's road. 114 indicates another vehicle that may collide with the own vehicle 102, and 116 indicates a center line of the intersecting road.

<C1: When the Own Vehicle is Turning Right, or When a Direction of the Right or Left Turn is Unknown (FIG. 3)>

Figure 3:
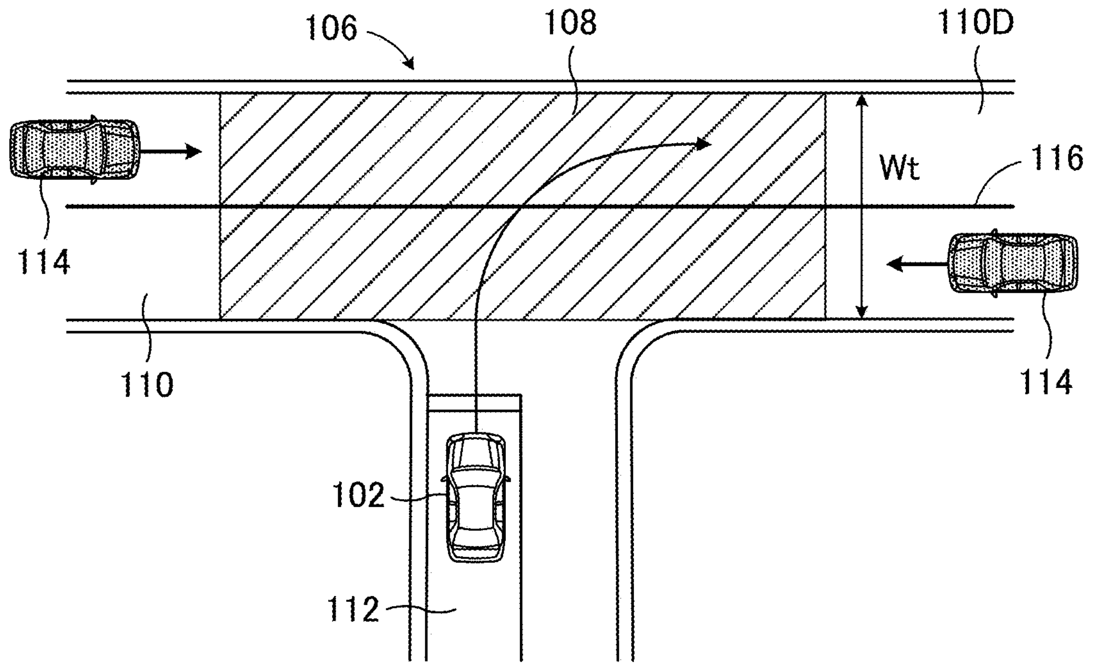
FIG. 3 is a diagram that explains the operation of the first embodiment in cases where an own vehicle is turning right and turning direction of the own vehicle is unknown.

When the own vehicle 102 is turning right at the intersection 106 or the direction of the right or left turn is unknown, a negative determination is made in step S20, and in step S40, as shown in FIG. 3, the possibility judgment area 108 is set so that a width direction range becomes a full width Wt of the intersecting road 110.

Therefore, in a situation where the own vehicle 102 is turning right, if another vehicle 114 approaches the possibility judgment area 108 from the left, and in a situation where the own vehicle is turning left, if another vehicle 114 approaches the possibility judgment area 108 from the right, it is possible to judge that there is a possibility of collision in either case. Therefore, as compared to where the width of the possibility judgment area 108 is a part of the full width of the intersecting road 110, the possibility of the own vehicle colliding with another vehicle can be judged appropriately, and appropriate alert can be issued regarding the possibility of a collision.

<C2: When the Own Vehicle Turns Left Onto an Intersecting Road Without a Center Line (FIG. 4)>

Figure 4:
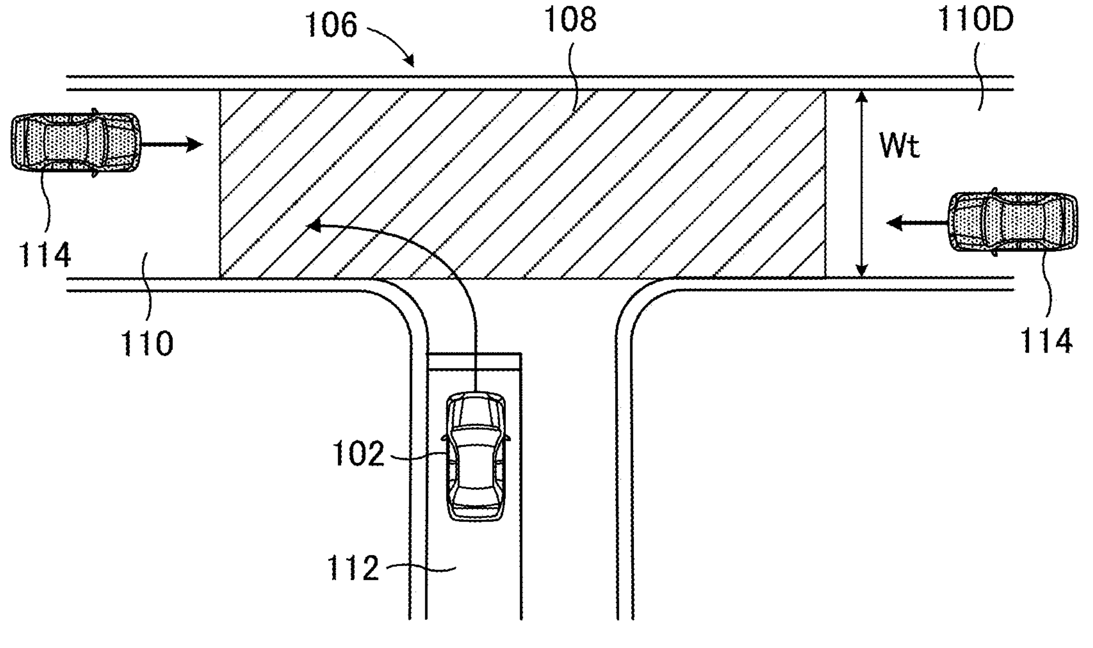
FIG. 4 is a diagram that explains the operation of the first embodiment in a case where the own vehicle is turning left onto an intersecting road without a center line.

When the own vehicle 102 turns left at the intersection 106 onto the intersecting road 110 without a center line, an affirmative determination is made in step S20, but a negative determination is made in step S30. Therefore, in step S40, as shown in FIG. 4, the possibility judgment area 108 is set so that the width direction range is the full width Wt of the intersecting road 110, in the same way as in case C1.

Therefore, in a situation where the own vehicle is turning left, if another vehicle 114 approaches the possibility judgment area 108 from the right, it can be judged that there is a possibility of collision. Also, in a situation where the own vehicle is turning left beyond a center of the intersecting road, if another vehicle 114 approaches the possibility judgment area 108 from the left, it can be judged that there is a possibility of collision. Therefore, as compared to where the width of the possibility judgment area 108 is a part of the full width of the intersecting road 110, the possibility of the own vehicle colliding with another vehicle can be judged appropriately, and an appropriate alert can be given regarding the possibility of a collision.

<C3: When the Own Vehicle Turns Left Onto an Intersecting Road With Multiple Lanes on Each Side (FIG. 5)>

Figure 5:
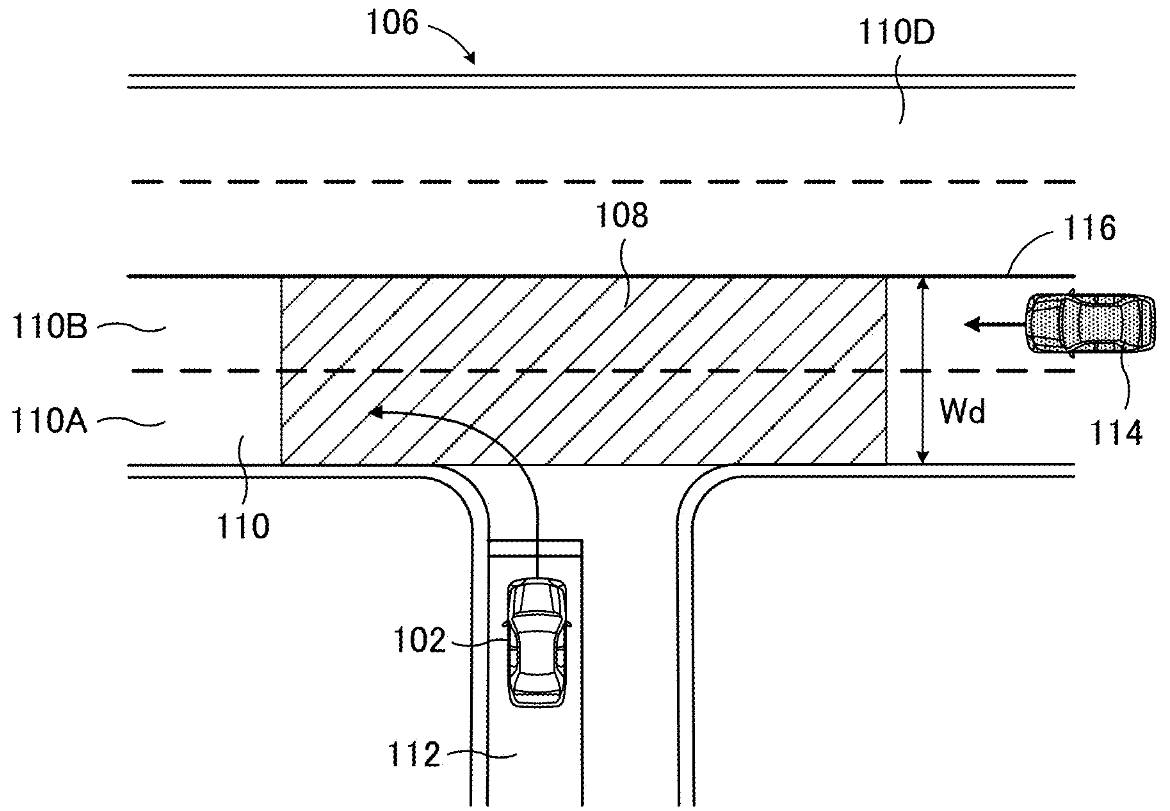
FIG. 5 is a diagram that explains the operation of the first embodiment when the own vehicle is turning left onto an intersecting road with multiple lanes on each side.

When the own vehicle 102 turns left at an intersection 106 onto the intersecting road 110 with multiple lanes on each side, affirmative determinations are made in steps S20 and S30, but a negative determination is made in step S50. Therefore, in step S60, a lane 110A are identified as the lanes in which the own vehicle 102 is estimated to travel after turning left and a lane 110B adjacent to the lane 110A. Furthermore, as shown in FIG. 5, the possibility judgment area 108 is set so that its width direction range is a width Wd of the two lanes 110A and 110B whose width direction range has been specified.

Therefore, as compared to where the width direction range of the possibility judgment area 108 is set only to the width of the lane in which the own vehicle 102 is estimated to travel after turning left, the possibility of judging that there is a possibility of collision between the own vehicle and another vehicle traveling in the adjacent lane when the own vehicle turns left by protruding into the adjacent lane can be increased. Therefore, as compared to where the width direction range of the possibility judgment area is only the width of the lane in which the own vehicle is estimated to travel after turning left, it is possible to appropriately determine the possibility of a collision with another vehicle and appropriately alert the driver to the possibility of a collision.

<C4: When the Own Vehicle Turns Left at a One-Way Intersection With a Single Lane, and the Width of the Intersecting Road is Greater Than a Reference Value (FIG. 6)>

Figure 6:
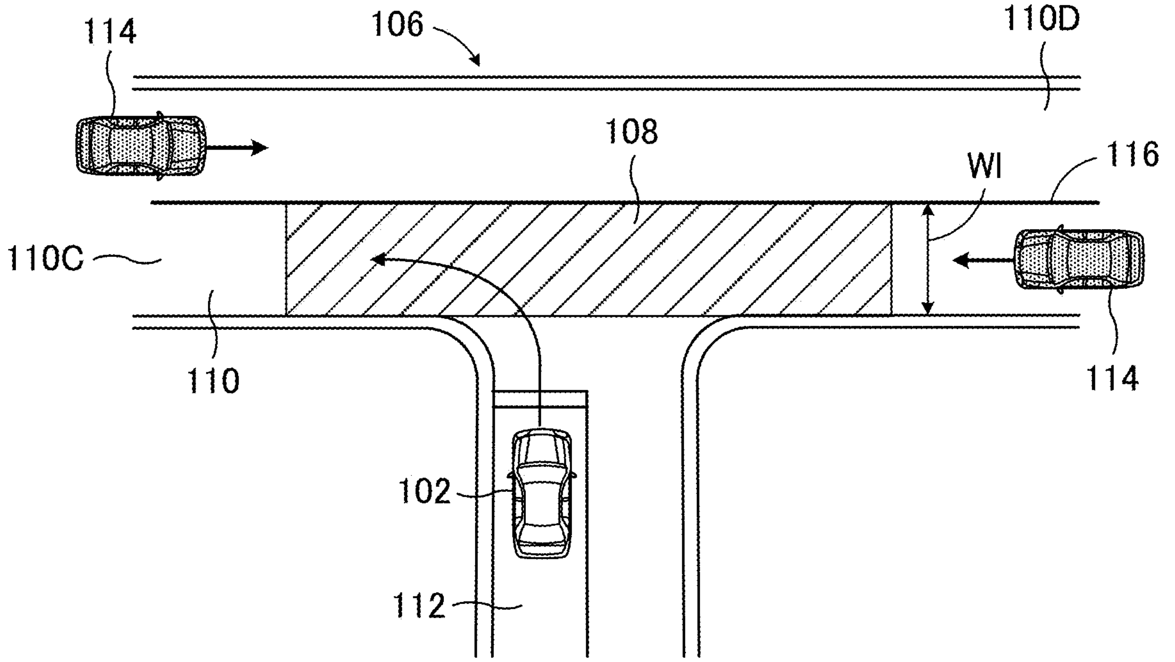
FIG. 6 is a diagram that explains the operation of the first embodiment when the own vehicle is turning left onto an intersecting road with a single lane on each side and a lane width of the intersecting road is equal to or greater than a reference value.

As shown in FIG. 6, when the own vehicle turns left onto a one-way road with a single lane, and a width W of the lane on the intersecting road is greater than the reference value Wc, an affirmative determination is made in step S50, but a negative determination is made in step S70. Therefore, in step S80, a lane 110C in which the own vehicle 102 is estimated to travel after turning left is identified, and the possibility judgment area 108 is set so that its width direction range is a width Wl of the identified lane 110C, for which the range in the width direction has been identified.

Therefore, if the width W of the lane on the intersecting road is large, even if the own vehicle makes a left turn by following a trajectory that causes it to swerve outwards, there is little risk of the own vehicle straying from the lane, so there is no need for the width direction range of the possibility judgment area 108 to exceed the width direction range of the lane in which the own vehicle is estimated to travel after turning left. The width direction range of the possibility judgment area 108 is set to the width of the lane in which the own vehicle is estimated to travel after turning left, so that it is possible to avoid setting the width of the possibility judgment area to an unnecessarily large width.

<C5: When the Own Vehicle Turns Left Onto an Intersecting Road With a Single Lane on Each Side and a Width of the Lane of the Intersecting Road is Less Than the Reference Value (FIG. 7)>

Figure 7:
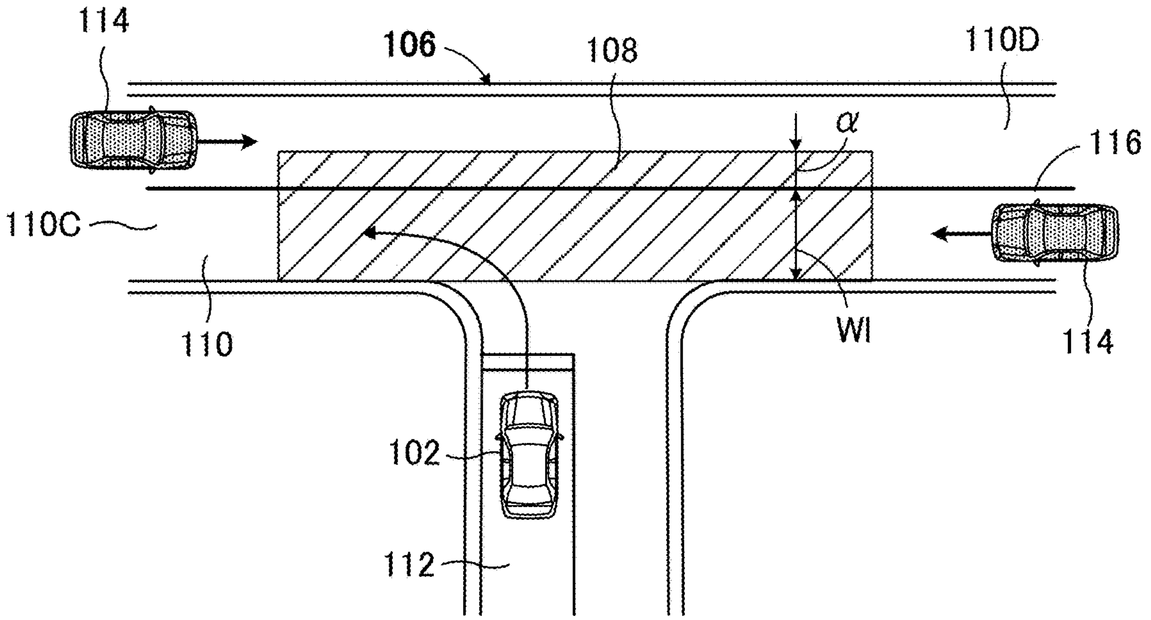
FIG. 7 is a diagram illustrating the operation of the first embodiment in a case where the own vehicle is turning left onto a one-way, single-lane intersecting road and a lane width of the intersecting road is less than the reference value.

As shown in FIG. 7, when the own vehicle turns left at an intersection with a single lane on each side and a width W of the lane of the intersecting road is less than the reference value Wc, affirmative determinations are made in steps S50 and S70. Therefore, in step S90, the possibility judgment area 108 is set so that its width direction range is a sum $Wl+\alpha$ of the width Wl of the lane 110C of the intersecting road and an additional width $\alpha$, which is part of an oncoming lane 110D.

Therefore, even if the own vehicle turns to the left to swerve, causing the outer wheels difference to increase, if there is another vehicle approaching the possibility judgment area from the left while driving in the oncoming lane, it is possible to judge the possibility of a collision. Therefore, as compared to where the width direction range of the possibility judgment area is set so that it does not include the width of a part of the oncoming lane, it is possible to appropriately judge the possibility of a collision between the own vehicle and another vehicle, and to appropriately alert the driver to the possibility of the collision.

Figure 8:
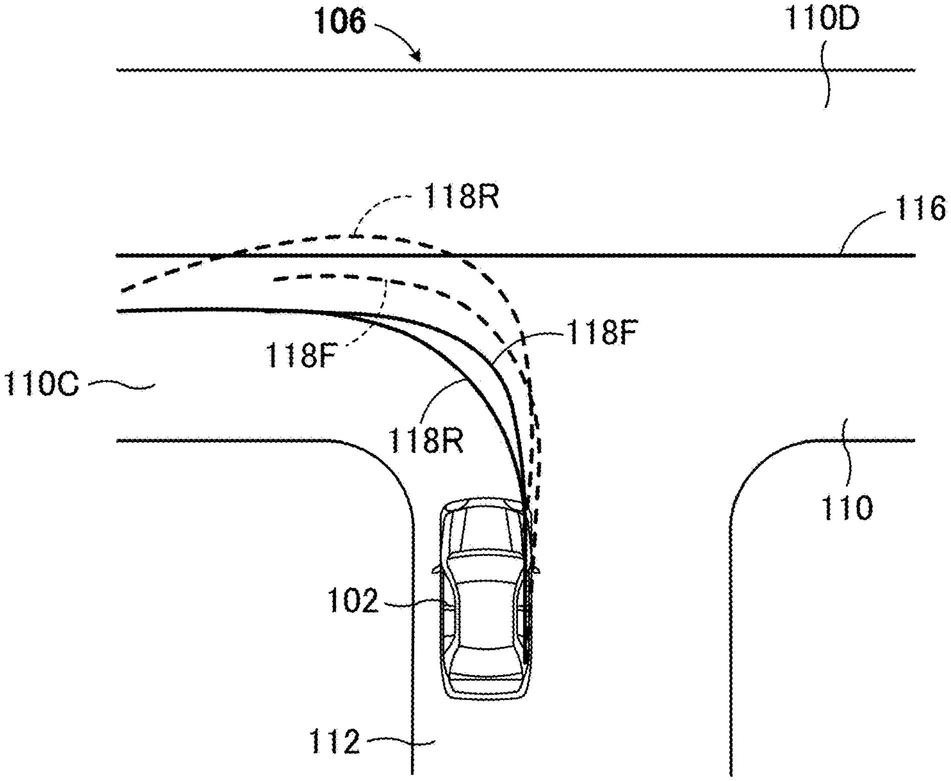
FIG. 8 is a diagram illustrating how a difference between outer wheels varies depending on a vehicle speed.

For example, as shown by solid lines in FIG. 8, when the speed V of the own vehicle 102 is low, an outer wheels difference, i.e., a difference between a trajectory 118F of an outer front wheel and a trajectory 118R of an outer rear wheel, is small. In contrast, as shown by broken lines in FIG. 8, when the vehicle speed V of the own vehicle 102 is high or a wheelbase is large, the outer wheels difference becomes large, and the own vehicle is likely to run off the lane 110C when turning left.

Second Embodiment

Figure 9:
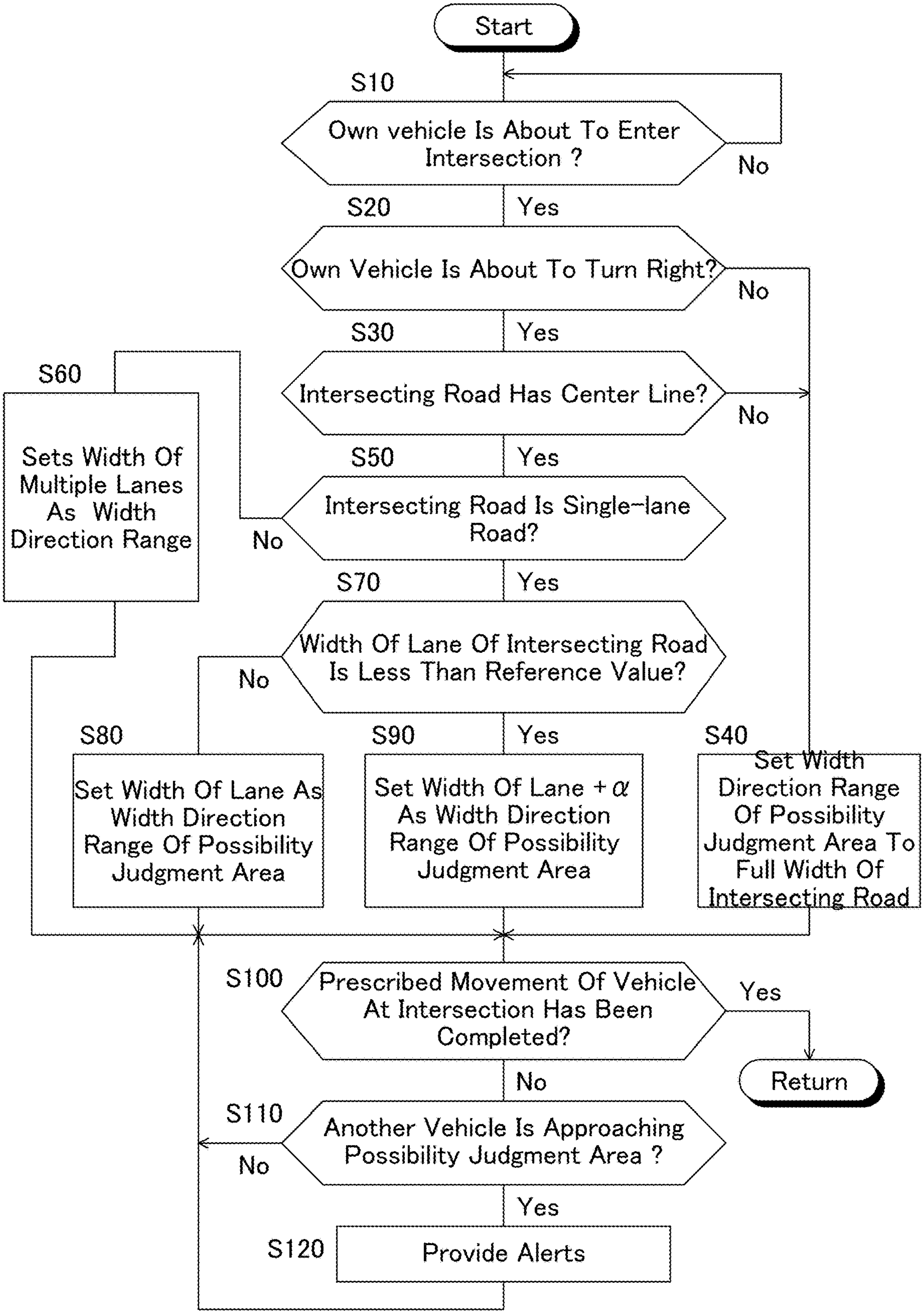
FIG. 9 is a flowchart corresponding to the alert control program of the second embodiment for countries where vehicles travel on the right.

In the second embodiment, the ROM of the driving assistance ECU 10 stores an alert control program for driving through an intersection corresponding to the flowchart shown in FIG. 9, and the CPU executes the alert control according to the program. The alert method in the second embodiment is executed by executing the alert control.

Alert Control when Driving Through an Intersection in the Second Embodiment

Next, referring to the flowchart shown in FIG. 9, will be explained the alert control when driving through an intersection in the second embodiment for countries where vehicles travel on the right. The alert control when driving through an intersection in the flowchart shown in FIG. 9 is repeatedly executed at predetermined intervals by the CPU of the driving assistance ECU 10 in a situation where the driving assistance switch is turned on.

As can be seen from the comparison between FIG. 9 and FIG. 2, steps S210 to S320 are executed in the same way as steps S10 to S120, except that the left and right sides are reversed.

Accordingly, in the second embodiment, in countries where vehicle traffic is on the right, for each of the above cases C1 to C5 where the own vehicle turns left or right at an intersection, the same effects as those described above can be obtained, except that the left and right sides are reversed.

As can be understood from the above explanation, according to the first and second embodiments, the width direction range of the possibility judgment area is set to be variable, depending on at least one of the direction of the left or right turn of the own vehicle at the intersection, a lane configuration of an intersecting road, and a width of a lane of the intersecting road.

Therefore, as compared to conventional alert devices, which have a fixed width direction range of the possibility judgment area regardless of the turning direction of the own vehicle at the intersection, the lane configuration of the intersecting road, and the width of the lane of the intersecting road, it is possible to appropriately alert the driver of the possibility of a collision with another vehicle when the own vehicle turns right or left at an intersection.

In addition, according to the preferred aspect of the first and second embodiments, the range of the additional width α is set to be variable in accordance with the vehicle speed of the own vehicle when entering the intersection, so that the range of the additional width α becomes larger as the vehicle speed of the own vehicle when entering the intersection is higher.

Therefore, as compared to where the range of the additional width α is constant regardless of the vehicle speed of the own vehicle when entering the intersection, it is possible to appropriately judge the possibility of a collision with another vehicle and to appropriately alert the driver to the possibility of the collision.

In addition, according to the preferred aspect of the first and second embodiments, the range of the additional width α is set according to the wheelbase of the own vehicle 102 so that the larger the wheelbase of the own vehicle, the larger the range of the additional width α becomes. Therefore, as compared to where the range of the additional width α is constant regardless of the wheelbase of the own vehicle, it is possible to appropriately judge the possibility of a collision between the own vehicle and another vehicle and to appropriately alert the driver to the possibility of the collision.

Although the present disclosure has been described in detail with reference to specific embodiments, it will be apparent to those skilled in the art that the present disclosure is not limited to the above-described embodiments, and various other embodiments are possible within the scope of the present disclosure.

For example, in the first and second embodiments described above, when it is determined that the intersecting road does not have a center line in step S30 or S230, the width direction range of the possibility judgment area is set to the full width Wt of the intersecting road in step S40 or S240, respectively. However, the width direction range of the possibility judgment area may be set to a range that includes a part of an oncoming lane and is smaller than the full width Wt of the intersecting road.

In the first and second embodiments described above, when the intersecting road is determined to be a single-lane road in step S50 or S250, the width direction range of the possibility judgment area is set to the width Wd of multiple lanes in steps S60 or S260. However, the width direction range of the possibility judgment area may be set to a sum of the width of the lane 110A, which is estimated to be traveled by the vehicle 102 after turning left or right, and a part of the width of the adjacent lane 110B (on the side of lane 110A).

In the first and second embodiments described above, when the width W of the lane of the intersecting road is greater than or equal to the reference value Wc and a negative determination is made in step S70, the width direction range of the possibility judgment area is set to the width Wl of lane 110A in step S80. However, the width direction range of the possibility judgment area may be set to a sum of the width of the lane 110A where the vehicle 102 is estimated to travel after turning left or right, and a part of the width of the adjacent lane 110B (on the side of lane 110A).

Furthermore, in the above description, the first embodiment for countries with left-hand traffic and the second embodiment for countries with right-hand traffic can be implemented, but depending on the country to which the present disclosure is applied, one of the above-mentioned first and second embodiments may be omitted.

What is claimed is:

1. An alert device including a notification device, a target information acquisition device that acquires information on targets around an own vehicle, and an electronic control unit configured to operate the notification device to provide an alert when the electronic control unit judges that there is a possibility of collision between the own vehicle and another vehicle based on the information on targets acquired by the target information acquisition device, wherein the electronic control unit is configured to acquire information on an intersection ahead of the own vehicle, to set a possibility judgment area that extends along an intersecting road that intersects with the own vehicle's road, and to judge whether or not there is a possibility of collision by judging whether or not there is another vehicle approaching the possibility judgment area, and further, the electronic control unit is configured to set a width direction range of the possibility judgment area variably according to at least one of turning direction of the own vehicle at the intersection, a lane configuration of the intersecting road, and a width of a lane of the intersecting road, wherein in a situation where the own vehicle is turning left at an intersection on a left-hand traffic road or turning right at an intersection on a right-hand traffic road and the intersecting road is a single-lane road with a single lane on each side, when a width of the lane in which the own vehicle is estimated to travel after turning left or right is equal to or greater than a reference value, the width direction range of the possibility judgment area is set to a width direction range of the lane in which the own vehicle is estimated to travel after turning left or right, and when the width of the lane in which the own vehicle is estimated to travel after turning left or right is less than the reference value, the width direction range of the possibility judgment area is set to a sum of the width direction range of the estimated lane and a width direction range of a part of an oncoming lane adjacent to the estimated lane.

2. The alert device according to claim 1, wherein the electronic control unit is configured to set the width direction range of the possibility judgment area to a full width range of the intersecting road when the own vehicle is turning right at an intersection on left-hand traffic road or turning left at an intersection on right-hand traffic road.

3. The alert device according to claim 2, the electronic control unit is configured to set the width direction range of the possibility judgment area to a full width range of the intersecting road when the own vehicle is turning left at an intersection on a left-hand traffic road or turning right at an intersection on a right-hand traffic road and there is no center line on the intersecting road.

4. The alert device according to claim 3, the electronic control unit is configured to set the width direction range of the possibility judgment area to a sum of a width direction range of a lane in which the own vehicle is estimated to travel after turning and a width direction range of an adjacent lane, when the own vehicle is turning left at an intersection on a left-hand traffic road or turning right at an intersection on a right-hand traffic road and the intersecting road is a multi-lane road with multiple lanes on each side.

5. The alert device according to claim 1, wherein the electronic control unit is configured to set the width direction range of the part of the oncoming lane in a variable manner according to a vehicle speed of the own vehicle when entering an intersection, so that the width direction range of the part becomes larger as the vehicle speed of the own vehicle when entering the intersection is higher.

6. The alert device according to claim 1, wherein the width direction range of the part of the oncoming lane is a range set in accordance with a wheelbase of the own vehicle so that the width direction range of the part becomes larger as the wheelbase of the own vehicle is larger.

7. An alert method that includes a step of acquiring information on targets around an own vehicle and, based on the acquired information on targets, activating a notification device to provide an alert when it is judged that there is a possibility of collision between the own vehicle and another vehicle, wherein the alert method further includes a step of acquiring information on an intersection in front of the own vehicle, a step of setting a possibility judgment area that extends along an intersecting road that intersects with the own vehicle's road, and a step of judging whether or not there is a possibility of collision by judging whether or not there is another vehicle approaching the possibility judgment area, and in the step of setting the possibility judgment area, a width direction range of the possibility judgment area is variably set according to at least one of turning direction of the own vehicle at the intersection, a lane configuration of the intersecting road, and a width of a lane of the intersecting road, wherein in a situation where the own vehicle is turning left at an intersection on a left-hand traffic road or turning right at an intersection on a right-hand traffic road and the intersecting road is a single-lane road with a single lane on each side, when a width of the lane in which the own vehicle is estimated to travel after turning left or right is equal to or greater than a reference value, the width direction range of the possibility judgment area is set to a width direction range of the lane in which the own vehicle is estimated to travel after turning left or right, and when the width of the lane in which the own vehicle is estimated to travel after turning left or right is less than the reference value, the width direction range of the possibility judgment area is set to a sum of the width direction range of the estimated lane and a width direction range of a part of an oncoming lane adjacent to the estimated lane.

8. A non-transitory computer-readable storage medium storing a program for causing a computer installed on an own vehicle to execute an alert control, the program causing the computer to implement processes of a step of acquiring information on targets around the own vehicle and, based on the acquired information on targets, and a step of activating a notification device to provide an alert when it is judged that there is a possibility of collision between the own vehicle and another vehicle, wherein the program further includes a step of acquiring information on an intersection in front of the own vehicle, a step of setting a possibility judgment area that extends along an intersecting road that intersects with the own vehicle's road, and a step of judging whether or not there is a possibility of collision by judging whether or not there is another vehicle approaching the possibility judgment area, and in the step of setting the possibility judgment area, a width direction range of the possibility judgment area is variably set according to at least one of turning direction of the own vehicle at the intersection, a lane configuration of the intersecting road, and a width of a lane of the intersecting road, wherein in a situation where the own vehicle is turning left at an intersection on a left-hand traffic road or turning right at an intersection on a right-hand traffic road and the intersecting road is a single-lane road with a single lane on each side, when a width of the lane in which the own vehicle is estimated to travel after turning left or right is equal to or greater than a reference value, the width direction range of the possibility judgment area is set to a width direction range of the lane in which the own vehicle is estimated to travel after turning left or right, and when the width of the lane in which the own vehicle is estimated to travel after turning left or right is less than the reference value, the width direction range of the possibility judgment area is set to a sum of the width direction range of the estimated lane and a width direction range of a part of an oncoming lane adjacent to the estimated lane.

* * * * *